United States Patent
Lee et al.

(10) Patent No.: US 8,667,590 B1
(45) Date of Patent: Mar. 4, 2014

(54) METHOD AND APPARATUS FOR PROTECTING HIGH AVAILABILITY DEVICES FROM COMPUTER VIRUSES AND OTHER MALICIOUS CONTENT

(75) Inventors: Jin-Shi Lee, Taipei (TW); Mu-Pen Tsai, Taipei (JP)

(73) Assignee: Trend Micro Incorporated, Tokyo (JP)

( * ) Notice: Subject to any disclaimer, the term of this patent is extended or adjusted under 35 U.S.C. 154(b) by 1204 days.

(21) Appl. No.: 12/212,015

(22) Filed: Sep. 17, 2008

Related U.S. Application Data

(63) Continuation of application No. 10/922,779, filed on Aug. 20, 2004, now abandoned.

(51) Int. Cl.
*G06F 11/30* (2006.01)

(52) U.S. Cl.
USPC .............. 726/24; 726/11; 726/12; 726/13; 726/22; 726/23; 713/188

(58) Field of Classification Search
USPC ................ 726/11–13, 22–24; 713/188
See application file for complete search history.

(56) References Cited

U.S. PATENT DOCUMENTS

| | | | |
|---|---|---|---|
| 5,398,196 A | | 3/1995 | Chambers |
| 5,862,054 A | * | 1/1999 | Li ................................. 700/121 |
| 5,948,104 A | | 9/1999 | Gluck et al. |
| 6,035,423 A | | 3/2000 | Hodges et al. |
| 6,687,732 B1 | * | 2/2004 | Bector et al. ................... 709/200 |
| 6,728,886 B1 | * | 4/2004 | Ji et al. ............................ 726/24 |
| 6,785,820 B1 | | 8/2004 | Muttik et al. |
| 6,842,861 B1 | | 1/2005 | Cox et al. |
| 6,981,280 B2 | * | 12/2005 | Grupe ............................. 726/22 |
| 8,544,096 B2 | * | 9/2013 | Van Brabant ................... 726/24 |
| 2003/0145228 A1 | | 7/2003 | Suuronen et al. |
| 2004/0054779 A1 | * | 3/2004 | Takeshima et al. ........... 709/225 |
| 2004/0133520 A1 | | 7/2004 | Callas et al. |
| 2005/0183138 A1 | | 8/2005 | Phillips et al. |
| 2005/0235164 A1 | * | 10/2005 | Gassoway ..................... 713/193 |
| 2006/0047823 A1 | * | 3/2006 | Cheng ........................... 709/229 |

* cited by examiner

*Primary Examiner* — Yin-Chen Shaw
(74) *Attorney, Agent, or Firm* — Okamoto & Benedicto LLP

(57) ABSTRACT

A technique for protecting a high availability device in a computer network includes deploying an appliance between the high availability device and a network connection. The high availability device may be a device configured for a manufacturing operation, such as wafer fabrication, for example. The appliance may be a transparent security appliance with a scanning engine for scanning packets for malicious content, such as computer viruses or worms, for example. Scanning control information can be supplied to the appliance by way of either a removable storage medium or a secure server coupled to the appliance, for example. The scanning control information can include a patch update, perhaps with signatures of viruses and associated control instructions. The appliance can then block any malicious content entering the appliance in response to the scanning control information. Among other advantages, the technique allows for low-cost, plug-and-play protection of high availability devices with good scalability to larger network configurations.

7 Claims, 4 Drawing Sheets

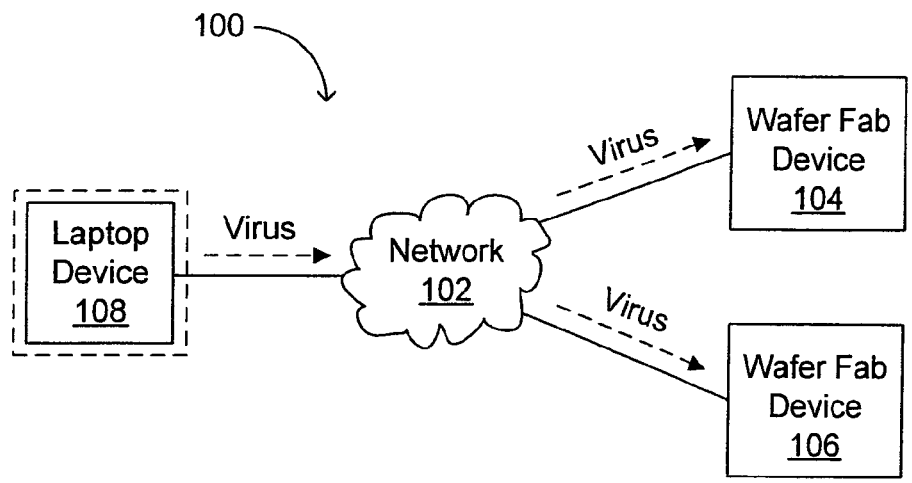
FIG. 1 (conventional)

METHOD AND APPARATUS FOR PROTECTING HIGH AVAILABILITY DEVICES FROM COMPUTER VIRUSES AND OTHER MALICIOUS CONTENT

REFERENCE TO RELATED APPLICATION

This application is a continuation of U.S. application Ser. No. 10/922,779, filed on Aug. 20, 2004, which is incorporated herein by reference in its entirety.

BACKGROUND OF THE INVENTION

1. Field of the Invention

The present invention relates generally to computer systems, and more particularly but not exclusively to computer networks.

2. Description of the Background Art

As is well known, computers belonging to a computer network may send data to one another. In addition, with ever expanding network structures and Internet connectivity, all sorts of network components and computing devices have access to each other. Unfortunately, some use this increased connectivity to quickly and easily spread malicious content, such as viruses and worms, to other devices. Further, viruses can be launched and spread even from within relatively secure private networks.

Referring now to FIG. 1, a schematic illustration of a conventional network arrangement for a wafer fabrication application is shown and indicated by the general reference character 100. In this example, Network 102 may be a private corporate intranet supporting wafer fabrication ("fab") equipment. Computing devices supporting various processing machines can include Wafer Fab Device 104 and Wafer Fab Device 106. Even though Network 102 can be considered relatively secure, a person may be able to simply plug in a computer, such as Laptop Device 108, that is infected with a virus. If this occurs, absent other protection, the virus can spread through Network 102 and to Wafer Fab Device 104 and Wafer Fab Device 106, as shown.

Accordingly, each component (e.g., "device," "agent," "computer," "machine," or "appliance") on the network must have some sort of virus protection in order to avoid becoming victimized by viruses from other network components. In particular, high availability devices, such as wafer fab, bank ATM machines, some medical, and some security devices, are especially vulnerable because these devices cannot typically be taken off-line or turned-off to allow for patch updates to any virus protection software.

SUMMARY

In one embodiment, a technique for protecting a high availability device in a computer network includes deploying an appliance between the high availability device and a network connection. The high availability device may be a device configured for a manufacturing operation, such as wafer fabrication, for example. The appliance may be a transparent security appliance with a scanning engine for scanning packets for malicious content, such as computer viruses or worms, for example. Scanning control information can be supplied to the appliance by way of either a removable storage medium or a secure server coupled to the appliance, for example. The scanning control information can include a patch update, perhaps with signatures of viruses and associated control instructions. The appliance can then block any malicious content entering the appliance in response to the scanning control information. Among other advantages, the technique allows for low-cost, plug-and-play protection of high availability devices with good scalability to larger network configurations.

These and other features of the present invention will be readily apparent to persons of ordinary skill in the art upon reading the entirety of this disclosure, which includes the accompanying drawings and claims.

DESCRIPTION OF THE DRAWINGS

FIG. 1 schematically illustrates a conventional network arrangement for a wafer fabrication application.

Figure 2A:
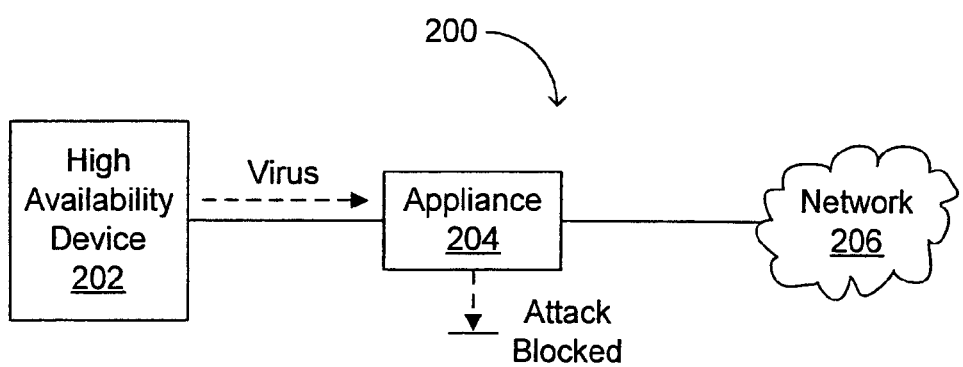
FIG. 2A schematically illustrates an appliance configuration and block of a virus coming from a high availability device in accordance with an embodiment of the invention.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are described herein using a private network, a corporate intranet, as well as other example network and sub-network arrangements as examples. It should be understood, however, that the invention is not so limited and may be employed in conjunction with other computer networks and/or arrangements. Similarly, although embodiments of the present invention are described using high availability devices as examples, the invention is equally suitable for use with other network components that cannot be routinely taken off-line or otherwise altered to accommodate patch updates for virus protection.

Being computer-related, it can be appreciated that the components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may then be executed by a processor. Components may be implemented separately in multiple modules or together in a single module.

Embodiments of the present invention allow for protection of high availability devices in a computer network in general.

For example, embodiments of the invention may be employed to configure appliances to protect high availability devices in a network, such as a corporate intranet, for example. As another example, embodiments of the invention may be employed to protect wafer fabrication control or processing equipment from virus attacks. As yet another example, embodiments of the invention may be employed to protect bank ATM or other financial business machines from virus attacks. As yet another example, embodiments of the invention may be employed to block virus attacks on devices in medical or research applications. As yet another example, embodiments of the invention may be employed to protect sensitive government computers from virus attacks. Further, deployment of the appliance is suitable for a wide variety of network arrangements, including those with secure servers for patch updates. These examples will be more apparent in light of the description that follows.

For purposes of the present disclosure, an appliance is a low-cost, stand-alone, special purpose network component. Unlike other network components, such as client and server computers, an appliance typically does not have its own display or external I/O peripherals. An example of an appliance is a transparent security appliance, such as those used for virus detection and the like. To keep the overall cost low, the processing requirements of an appliance is kept to a minimum by having one appliance assigned to one high availability device (i.e., one-to-one deployment as opposed to one-to-many). An appliance as disclosed in the following embodiments includes an antivirus mechanism, such as a scanning engine and a pattern file. The pattern file may contain virus signatures, algorithms, and/or other information for dealing with viruses. The scanning engine, pattern file, or both may be "patched" by providing updates to the appliance. Embodiments of the invention include appliances deployed to network arrangements for the protection of high availability devices against malicious content.

Referring now to FIG. 2A, a schematic illustration of an appliance configuration and blocking of a virus coming from a high availability device in accordance with an embodiment of the invention is shown and indicated by the general reference character 200. Appliance 204 can by deployed between High Availability Device 202 and Network 206. Effectively, Appliance 204 can be deployed in series with the network connection of High Availability Device 202 to Network 206. High Availability Device 202 can be a device used in a manufacturing operation, such as wafer fabrication. As another example, High Availability Device 202 can be associated with a bank ATM or other financial business machine. In any event, a typical characteristic is that it is difficult for devices such as High Availability Device 202 to be taken off-line to allow for patch updates for virus protection.

In FIG. 2A, if High Availability Device 202 is already infected with a virus, Appliance 204 can block the attack from the rest of Network 206, as shown. Because High Availability Device 202 may not be able to receive patch updates to protect itself from the latest virus, worm, or other malicious content, Appliance 204 can contain necessary patch updates. In one embodiment, Appliance 204 can receive patch updates by way of a removable storage medium, such as a floppy disk or a memory stick coupled to a Universal Serial Bus (USB) port. The patch updates can include, for example, signatures of viruses and associated control instructions, such as how to deal with any encountered malicious content.

In this fashion, an appliance can be deployed to a network in order to protect a network, such as a corporate network, from an infected machine. The machine may be a high availability device previously infected. Accordingly, a virus or the like may be isolated from causing further damage to the network. Further, the appliance can be configured with patch updates for the latest malicious content protection by way of a removable storage medium.

Figure 2B:
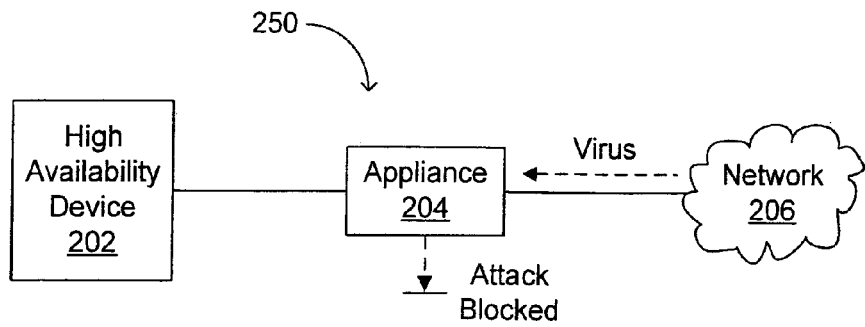
FIG. 2B schematically illustrates an appliance configuration and block of a virus coming from a network in accordance with an embodiment of the invention.

Referring now to FIG. 2B, a schematic illustration of an appliance configuration and block of a virus coming from a network in accordance with an embodiment of the invention is shown and indicated by the general reference character 250. In this example, Network 206 contains malicious content, such as a virus or worm. The virus can attempt to pass through Appliance 204 in order to attack High Availability Device 202. However, Appliance 204 can block the attack and protect High Availability Device 202. As discussed above, Appliance 204 can receive patch updates by way of a removable storage medium, such as a floppy disk or a memory stick coupled to a USB port. The patch updates can include, for example, signatures of viruses and associated control instructions, such as how to deal with any encountered malicious content.

In this fashion, an appliance can be deployed to a network in order to protect a high availability device, such as a device configured for a manufacturing or financial operation, from an infected network. The infection on the network may have arisen from any other network component that previously or is currently plugged-in to the network. In accordance with embodiments of the invention, a virus or the like may be blocked by the appliance so that no damage can be caused to the high availability device. The appliance can effectively scan packets of data entering and take action based on scanning control information, such as from a patch update. In order to keep the appliance updated, the appliance can receive patch updates for the latest malicious content protection by way of a removable storage medium. Accordingly, the high availability device does not need to be taken off-line to accommodate malicious content protection measures. Note that, for purposes of the present disclosure, "scanning packets" may include assembling packets into files and other data structures to look for malicious content.

Figure 3:
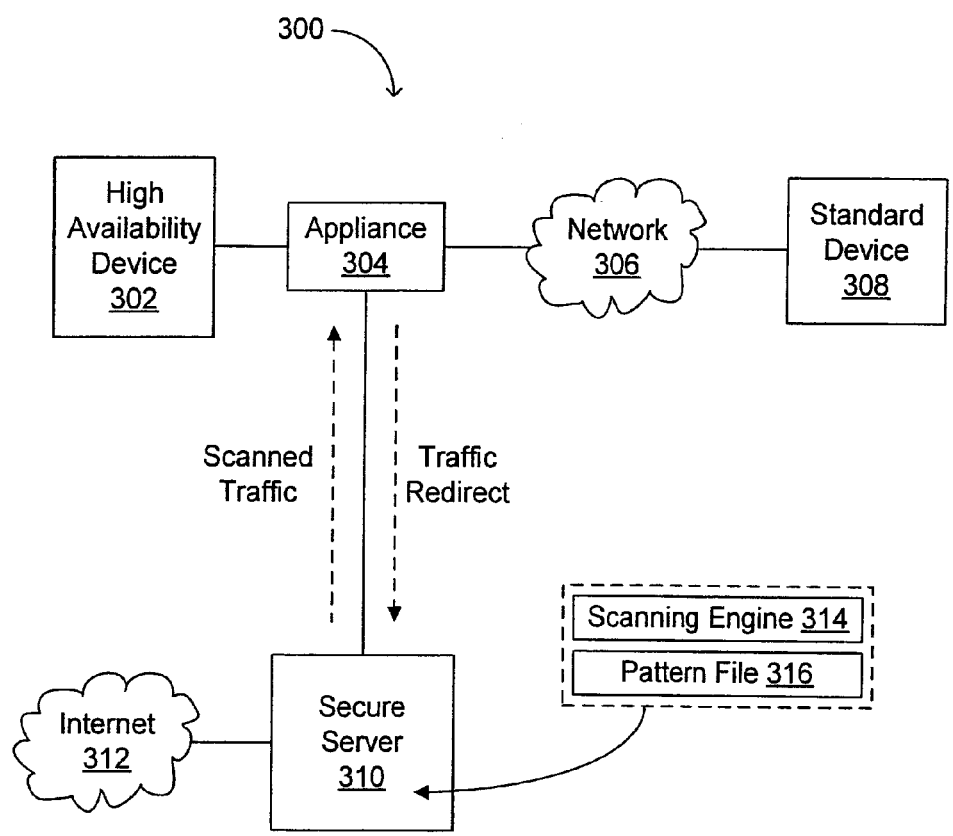
FIG. 3 schematically illustrates a system including an appliance and a secure server configuration in accordance with an embodiment of the invention.

Referring now to FIG. 3, a schematic illustration of a system including an appliance and a secure server configuration in accordance with an embodiment of the invention is shown and indicated by the general reference character 300. Appliance 304 can connect between High Availability Device 302 and Network 306. Standard Device 308 can also connect to Network 306. Appliance 304, High Availability Device 302, and Network 306 can be the same or similar to those discussed above with reference to FIGS. 2A and 2B. Accordingly, Network 306 may be a private or relatively secure network, such as a corporate network for a manufacturing operation.

In FIG. 3, system 300 can also include Secure Server 310, which can connect to Appliance 304 and Internet 312. Internet 312 can be any public or relatively open type of network. Secure Server 310 can be a scan server that has relatively more computing resources in comparison to the smaller and relatively low-cost Appliance 304. Accordingly, in one embodiment, if the traffic load gets too heavy going through the smaller Appliance 304, the traffic can be redirected to Secure Server 310 for scanning. Secure Server 310 can include Scanning Engine 314 and Pattern File 316. Pattern File 316 can include scanning control information, such as patch updates and/or signatures of viruses or other malicious content, as well as associated control instructions. Such control instructions may include designations as to what action should be taken upon encountering a particular virus, for example. After scanning the redirected traffic, Secure Server 310 can then return the scanned traffic back to Appliance 304 for forwarding to its intended destination.

In the example arrangement of FIG. 3, Secure Server 312 can obtain patch updates or the like from a vendor server or web site accessible via Internet 312. For example, whenever a new virus is found, the vendor server or other appropriate web site may include updated scanning control information (e.g., pattern files). Secure Server 310 may obtain a copy of the updated scanning control information and store in Pattern File 316. Secure Server 310 may then provide the updated scanning control information (e.g., patch updates) to Appliance 304. Accordingly, Appliance 304 can be configured to scan entering packets of data for malicious content, including the latest discovered viruses. So, High Availability Device 302 can be protected from virus attacks from Network 306 because Appliance 304 can block them.

In this fashion, a relatively small and low-cost appliance can be deployed to a network in order to protect a high availability device from an infected network. Examples of such high availability devices include devices configured for manufacturing, financial, security, or medical applications, to name a few. The infection on the network may have arisen from any other network component that plugged-in to the network. In accordance with embodiments of the invention, a virus or the like may be blocked by the appliance so that no damage can be caused to the high availability device. The appliance can effectively scan packets of data entering and take action based on scanning control information, such as from a patch update. In order to keep the appliance updated, the appliance can receive patch updates for the latest malicious content protection by way of a server. The server can be a relatively large and secure server and the server can receive the patch updates from the Internet, for example. Further, if traffic flowing through the appliance is too heavy, the traffic can be redirected to the server for scanning. In any event, the high availability device does not need to be taken off-line to accommodate malicious content protection measures.

Figure 4:
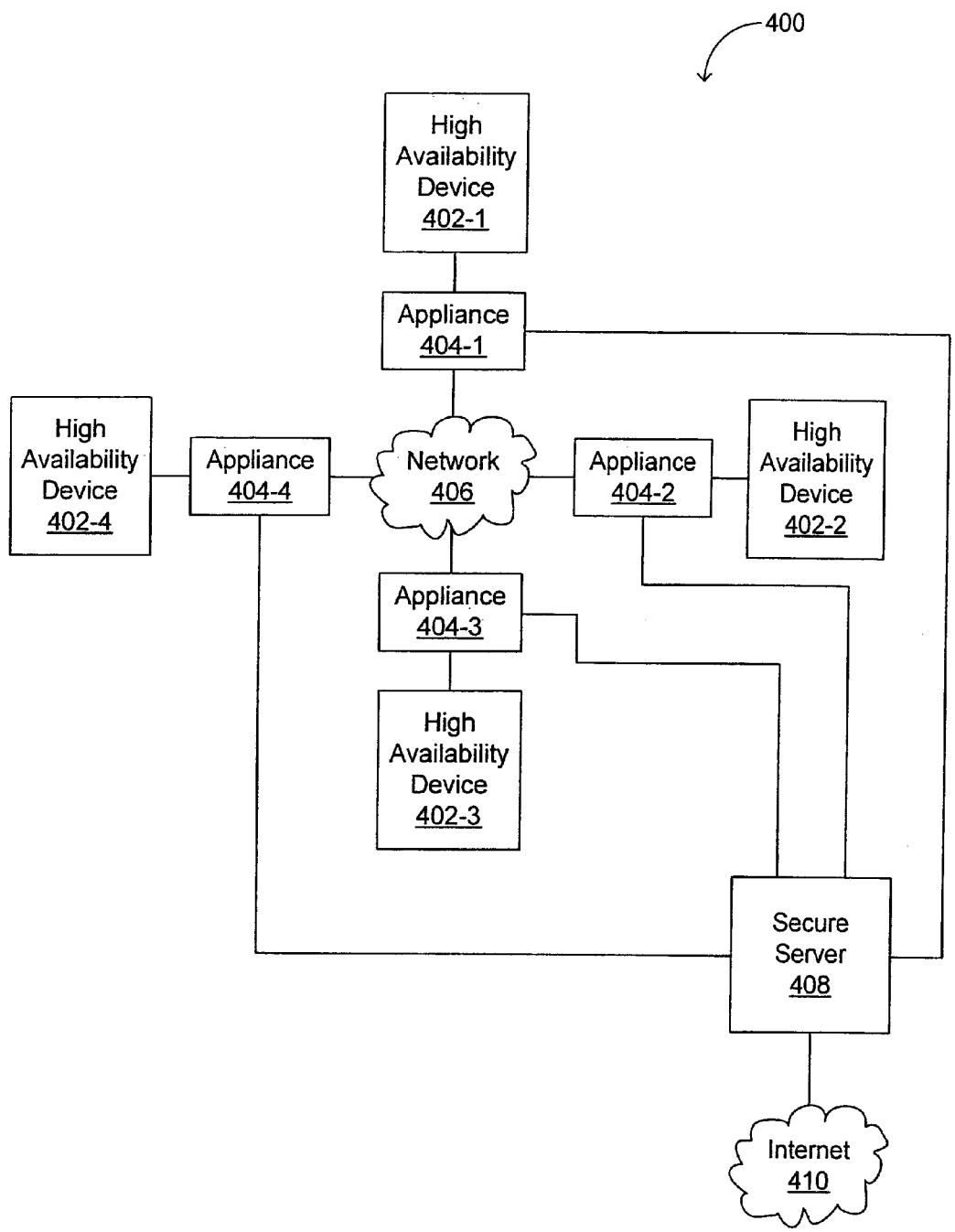
FIG. 4 schematically illustrates a multiple high availability device and multiple appliance arrangement with a secure server in accordance with an embodiment of the invention.

Referring now to FIG. 4, a schematic illustration of a multiple high availability device and multiple appliance arrangement with a secure server in accordance with an embodiment of the invention is shown and indicated by the general reference character 400. Appliance 404-1 can connect to Network 406 and to High Availability Device 402-1. Appliance 404-2 can connect to Network 406 and to High Availability Device 402-2. Appliance 404-3 can connect to Network 406 and to High Availability Device 402-3. And, Appliance 404-4 can connect to Network 406 and to High Availability Device 402-4. Further, each of Appliances 404-1, 404-2, 404-3, and 404-4 can connect to Secure Server 408. Secure Server 408 can also connect to Internet 410. Appliances, 404-1, 404-2, 404-3, and 404-4, High Availability Devices, 402-1, 402-2, 402-3, and 402-4, and Network 406 can be the same or similar to those discussed above with reference to FIG. 3. Accordingly, Network 406 may be a private or relatively secure network, such as a corporate network for a manufacturing operation. Secure Server 408 may be a relatively large scan server configured to accept redirected traffic from one or more of Appliances 404-1, 404-2, 404-3, and 404-4, and/or to provide patch updates retrieved via Internet 410 to Appliances 404-1, 404-2, 404-3, and 404-4 for scanning. Accordingly, Secure Server 408 may contain a scanning engine as well as a pattern file.

As an example of the possible accommodations possible in system 400, Appliances 404-1, 404-2, and 404-3 can scan incoming traffic and protect High Availability Devices 402-1, 402-2, and 402-3, respectively. However, if an Appliance 404-4 receives a traffic load for scanning that is more than a designated threshold level, Appliance 404-4 can redirect traffic to Secure Server 408 for scanning. Thus, Secure Server 408 can accommodate scanning itself, such as redirected from Appliance 404-4, and/or support scanning by providing patch updates to smaller associated appliances 404 (e.g., 404-1, 404-2, . . . ). Secure Server 408 can also forward scanned traffic back to appliance 404, which can then forward the scanned traffic to its intended destination.

In this fashion, relatively small and low-cost appliances can be deployed to a network in order to protect associated high availability devices from viruses and other malicious content. Examples of such high availability devices include devices configured for manufacturing, financial, security, or medical applications, to name a few. In accordance with embodiments of the invention, a virus or the like from the network may be blocked by the appliance so that no damage can be caused to the high availability device. The appliance can effectively scan packets of data entering and take action based on scanning control information, such as from a patch update. In order to keep the appliance updated, the appliance can receive patch updates for the latest malicious content protection by way of a server. The server can be a relatively large and secure server and the server can receive the patch updates from the Internet, for example. Further, if traffic flowing through any of the system appliances is too heavy, that traffic can be redirected to the server for scanning. In any event, none of the high availability devices in the system requires off-line patch updating for virus protection.

Figure 5:
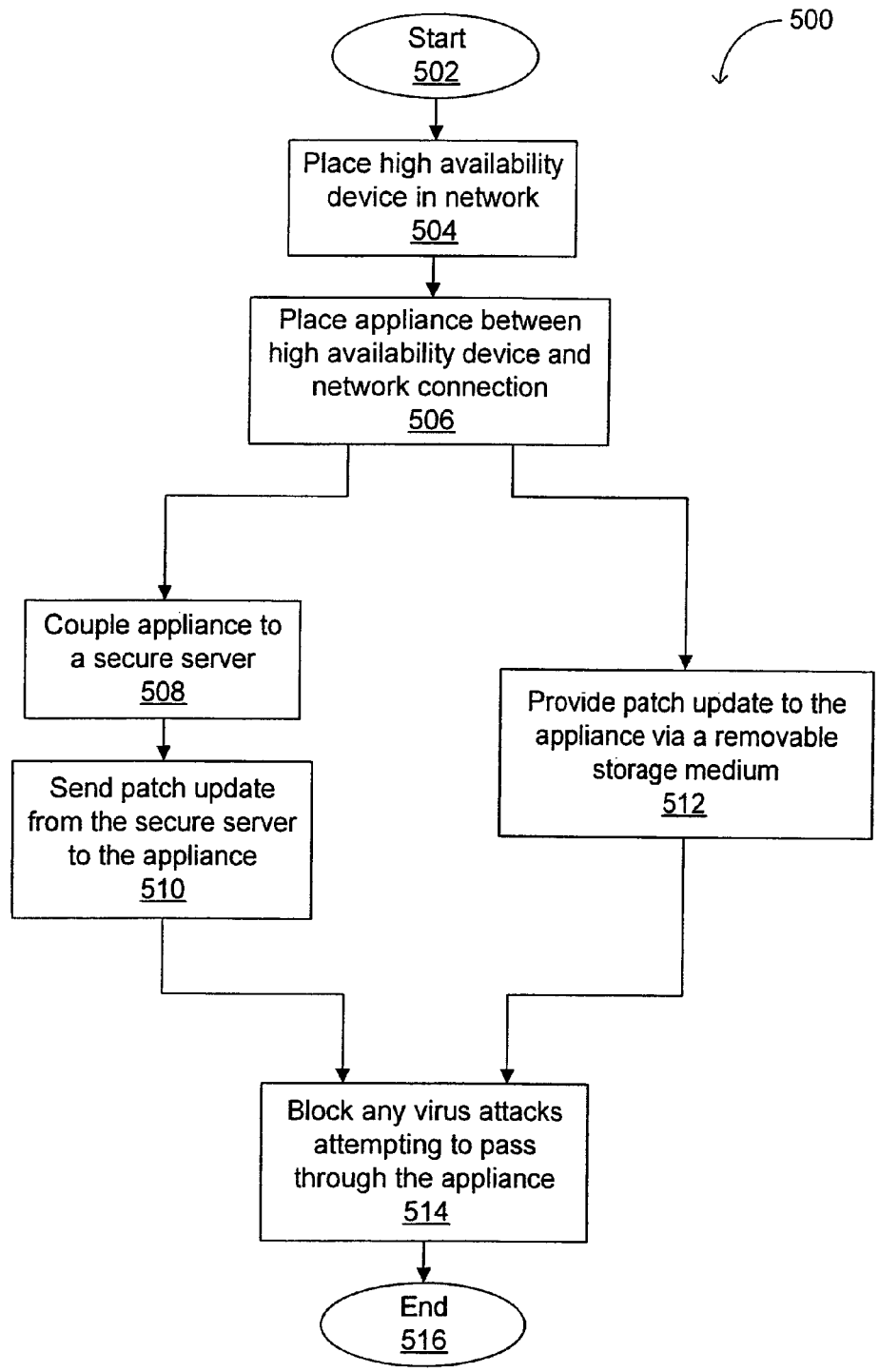
FIG. 5 shows a flow diagram of an appliance patch update sequence for configurations both with and without a secure server in accordance with an embodiment of the invention.

Referring now to FIG. 5, a flow diagram of an appliance patch update sequence for configurations both with and without a secure server in accordance with an embodiment of the invention is shown and indicated by the general reference character 500. The flow can begin in Start 502 and a high availability device can be placed in a network, such as a private network (504). An appliance can be placed between the high availability device and a network connection (506) in a one-to-one configuration (i.e., one appliance to one high availability device). If the network including the high availability device is such that, for cost, space, or other reasons, does not include a secure server, a patch update to the appliance can be provided by way of a removable storage medium (512). According to embodiments of the invention, such a storage medium can be a floppy disk or a memory stick coupled to a USB port, for example. In some implementations, the appliance may also be directly connected to the Internet or other network to obtain a patch. In appropriate applications, the appliance can be connected to a secure server (508) and patch updates can be provided to the appliance from the secure server (510). Further, the patch updates can be retrieved by the secure server from a vendor server or web site via the Internet or a public network. In any event, any virus attacks attempting to pass through the appliance can be blocked (514) and the flow can complete in End 516.

In this fashion, relatively small and low-cost appliances can be deployed to a network in order to protect associated high availability devices from an infected network. For smaller, low-cost systems containing high availability devices, patch updates for virus protection may be provided to the appliance by way of a removable storage device. However, for other systems that contain a secure server, patch updates may be provided to each appliance in the system from the secure server. In each type of system, in accordance with embodiments of the invention, a virus or the like from the network may be blocked by the appliance so that no damage can be caused to the high availability device. Accordingly, high availability devices in the system can be protected from malicious content without requiring off-line patch updating for virus protection.

In light of the present disclosure, it can be appreciated that the present invention may be generally employed to facilitate the protection of high availability devices by use of low-cost appliances. For example, embodiments of the present invention may be used to facilitate the protection of high availability devices by blocking malicious content with an appliance, such as a transparent security appliance. For example, embodiments of the present invention advantageously allow networks to be easily protected by security appliances configured to scan for viruses.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of scanning data for computer viruses in a computer network, the method comprising:
   receiving data in a network component of the computer network;
   scanning the data for computer viruses either in the network component or in a server computer depending on traffic load through the network component; and
   forwarding the data from the network component to its intended destination after the data has been scanned for computer viruses either in the network component or in the server computer;
   wherein scanning the data in the server computer comprises:
   transmitting the data from the network component to the server computer over the computer network, scanning the data for computer viruses in the server computer, and transmitting the data from the server computer to the network component over the computer network;
   wherein the network component comprises a security appliance coupled to one high availability device, the high availability device being of a type that cannot be readily brought down for updating;
   wherein the high availability device includes a device configured for a manufacturing operation;
   wherein the computer network includes a private network; and
   wherein the manufacturing operation includes wafer fabrication.

2. The method of claim 1 wherein the data comprises network packets.

3. The method of claim 1 further comprising, providing scanning control information from the server computer to the network component.

4. The method of claim 3 wherein the scanning control information comprises signatures of computer viruses.

5. A method of scanning data for computer viruses, the method comprising:
   receiving incoming data in a network component of a computer network;
   scanning the incoming data for malicious content in the network component when the network component is able to scan the incoming data;
   scanning the incoming data for malicious content in a first computer when the network component is not able to scan the incoming data, the first computer receiving the incoming data from the network component over the computer network and forwarding the incoming data back to the network component after the incoming data has been scanned for malicious content; and
   providing the incoming data from the network component to a second computer after the incoming data has been scanned for malicious content;
   wherein the network component comprises an appliance and the first computer comprises a high availability device that cannot be readily brought down for updating;
   wherein the computer network includes a private network.

6. The method of claim 5 further comprising:
   providing scanning control information from the first computer to the network component.

7. The method of claim 6 wherein the scanning control information comprises signatures of computer viruses.

* * * * *